US012287078B2

(12) United States Patent
Reuser et al.

(10) Patent No.: US 12,287,078 B2
(45) Date of Patent: Apr. 29, 2025

(54) OUTDOOR LUMINAIRE FOR SUSPENDED MOUNTING WITH SWAY COMPENSATION

(71) Applicant: SIGNIFY HOLDING B.V., Eindhoven (NL)

(72) Inventors: René Cornelis Reuser, Velp (NL); Nicolaas Antonie Van Rijswijk, Oss (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/700,740

(22) PCT Filed: Oct. 10, 2022

(86) PCT No.: PCT/EP2022/078085

§ 371 (c)(1),
(2) Date: Apr. 12, 2024

(87) PCT Pub. No.: WO2023/061932

PCT Pub. Date: Apr. 20, 2023

(65) Prior Publication Data

US 2024/0410540 A1 Dec. 12, 2024

(30) Foreign Application Priority Data

Oct. 14, 2021 (EP) .................................... 21202702
Jan. 6, 2022 (EP) .................................... 22150397

(51) Int. Cl.
*F21S 8/06* (2006.01)
*F21V 21/008* (2006.01)
(Continued)

(52) U.S. Cl.
CPC ............ *F21S 8/068* (2013.01); *F21V 21/008* (2013.01); *F21V 21/02* (2013.01); *F21V 23/0435* (2013.01)

(58) Field of Classification Search
CPC .... F21V 23/0435; F21V 21/02; F21V 21/008; F21S 8/068
See application file for complete search history.

(56) References Cited

U.S. PATENT DOCUMENTS 9,196,950 B1 11/2015 Leiba
2007/0252528 A1 11/2007 Vermuelen et al.
(Continued)

FOREIGN PATENT DOCUMENTS

CN 206545865 U 10/2017
EP 3236146 A1 * 10/2017 ............... F21K 9/68
(Continued)

*Primary Examiner* — Zheng Song

(57) ABSTRACT

The invention relates to an outdoor luminaire (10) for suspended mounting from, or attached to a line (15), the luminaire (10) comprising a first modulation unit (45) and a first antenna unit (50), the modulation unit configured to operate as a communication node in a wireless data network. The antenna unit (50), having an anisotropic radiation pattern, mounted inside a cavity (55) of a luminaire housing (20). The luminaire further comprising a levelling unit (60) attached to the housing on the one hand and the antenna unit on the other, for maintaining an orientation of the antenna unit, when the luminaire is mounted on a line and sways under influence of the elements.

14 Claims, 5 Drawing Sheets

(51) Int. Cl.

| | |
|---|---|
| ***F21V 21/02*** | (2006.01) |
| ***F21V 23/04*** | (2006.01) |

(56) References Cited

U.S. PATENT DOCUMENTS

| | | | | |
|---|---|---|---|---|
| 2012/0154239 | A1 | 6/2012 | Bar-Sade et al. | |
| 2013/0321225 | A1 | 12/2013 | Pettus | |
| 2015/0362172 | A1* | 12/2015 | Gabriel .................... | F21V 11/16 348/151 |
| 2018/0062246 | A1 | 3/2018 | Hershey et al. | |
| 2018/0139821 | A1* | 5/2018 | Deshpande .......... | H05B 47/183 |
| 2019/0226672 | A1 | 7/2019 | Abbott et al. | |
| 2021/0167853 | A1 | 6/2021 | Draaijer et al. | |

FOREIGN PATENT DOCUMENTS

| | | | | |
|---|---|---|---|---|
| JP | S61152101 | A | 7/1986 | |
| WO | WO-2010140136 | A1 * | 12/2010 | .......... F21V 23/0435 |
| WO | 2016071810 | A1 | 5/2016 | |
| WO | 2017014841 | A1 | 1/2017 | |
| WO | WO-2024235692 | A1 * | 11/2024 | |

* cited by examiner

OUTDOOR LUMINAIRE FOR SUSPENDED MOUNTING WITH SWAY COMPENSATION

CROSS-REFERENCE TO PRIOR APPLICATIONS

This application is the U.S. National Phase application under 35 U.S.C. § 371 of International Application No. PCT/EP2022/078085, filed on Oct. 10, 2022, which claims the benefit of European Patent Application No. 21202702.3, filed on Oct. 14, 2021 and European Patent Application No. 22150397.2, filed on Jan. 6, 2022. These applications are hereby incorporated by reference herein.

FIELD OF THE INVENTION

The invention relates to the field of outdoor lighting and communication networks. More particularly, various outdoor luminaires and outdoor lighting systems are disclosed herein wherein the luminaires are arranged for mounting on or suspended from a line and are fitted with a modulation and antenna unit for use as a wireless node in a wireless data network.

BACKGROUND OF THE INVENTION

In the past outdoor lighting systems were designed and deployed to provide illumination to improve visibility in low daylight conditions throughout the outdoor environment, such as on streets, in park, or at public venues. However, over the last two decades outdoor lighting systems have been evolving in part by the proliferation of networked technology.

More recently omnidirectional radios were added to streetlights in outdoor lighting systems, such as disclosed in United States Patent Application US 2007/0252528 A1. These radios enable remote control of the lighting infrastructure using a wireless lighting control network. Radios, such as those based on IEEE802.15.4 technology allow the individual streetlights or lighting fixtures to operate as a wireless mesh network which when combined with a central controller allow a more versatile and flexible operation of the streetlights.

Over the last decade, there is a growing need for network connectivity, in particular within the smart city context. By deploying audio, video and environmental sensors municipalities can monitor the outdoor environment, which in combination with data collection and artificial intelligence allows for a better understanding and thus control of the urban environment. In addition, there is also a need for deploying a denser end-user communication service infrastructure, to enable new and/or better services to be provided to users within the urban environment.

SUMMARY OF THE INVENTION

Although outdoor lighting systems are good candidates for providing services beyond lighting, the uptake of connected lighting services does not appear to be in line with the need for such services. Several obstacles may be identified. Cost is an important obstacle for municipalities. And although power generally is available at the location of legacy lighting fixtures, the communication infrastructure generally is not. Installing a wired data communication network to support the deployment of a data communication network within an outdoor lighting system can be very costly, as it requires closing roads and post-installation repairing the streets and/or sidewalks where such wired communication links were installed.

Use of a wireless data communication network on the other hand will require mounting of additional wireless radio communication devices to the lighting fixtures which results in the fixtures having mounted thereon usually rather unsightly pods or modules. Instead, the inventors propose to install a high-capacity data communication network in the outdoor lighting systems, by embedding directional Radio Frequency, RF, communication equipment within the luminaires.

However when such luminaires use radios that have anisotropic radiation patterns, (for example when using direction antennas), and such luminaires are mounted suspended from a line, sway may affect the data communication links in the network adversely. Thus a need exists to compensate for sway so as to maintain the radio communication link.

In order to ameliorate at least one of the above problems, the present disclosure is directed to outdoor luminaires and outdoor lighting systems. More particularly, the goal of this invention is achieved by an outdoor luminaire as claimed in claim 1 and an outdoor lighting system as claimed in claim 10.

In accordance with a first aspect of the invention an outdoor luminaire is provided for suspended mounting from or attached to, a line, the luminaire comprising: a housing of the luminaire having a first exit window for egress of illumination light and a second exit window for ingress and egress of a radio communication signals: fastening means or mounting point attached to the housing for attaching the housing to the line: a power input for providing power to the luminaire: a levelling unit attached to the housing or to a member that is attached to the housing in a fixed manner, and to an antenna unit inside an interior cavity of the housing, the levelling unit configured to either passively, utilizing gravity, or actively, utilizing a rotational actuator, counter rotational movement of the luminaire along a rotational axis parallel to the line at the mounting point and a first modulation unit for use as a communication node in a wireless data network connected to the antenna unit, the first modulation unit configured to generate a first modulation signal: the antenna unit attached to the levelling unit, wherein the antenna unit comprises at least one antenna for: emitting a first radio signal based on the first modulation signal through the second exit window along a radiation pattern, when level, in line with a plane orthogonal to the gravitational axis when the luminaire is mounted and for receiving a second radio signal through the second exit window; and a lighting unit comprising one or more light sources for emitting illumination light through the first exit window.

The luminaire in accordance with the first aspect when mounted on a wire and subjected to the elements, may sway, for example under influence of wind. When using directional antennas, sway may affect the antenna orientation, which in turn negatively affects link quality and may result in loss of connection. The first aspect addresses this point by providing a levelling unit internal to the housing of the luminaire which provides sway compensation for the antenna unit, in at least one rotational direction, to thereby reduce the impact of luminaire sway on link quality. By compensating for the rotational movement, the change in elevation resulting from the luminaire rotation (and possibly also the change in azimuth-depending on the antenna orientation (azimuth) relative to the sway rotatio) can be reduced.

The luminaire is preferably constructed for mounting on a load bearing line or wire between two poles, typically a steel cable. Multiple luminaires may be suspended from a single line. The luminaire preferably is attached in a manner that limits the freedom of motion of the luminaire, to minimize sway. This may for example involve a luminaire housing with a clamp that can be clamped to the wire, for example by closing the clamp and securing it using a screw or bolt. Alternatively, the clamp may also include a rigid arm that is part of the luminaire housing or body. Although different methods of mounting may be foreseen, to minimize the movement of the luminaire a direct mounting of the housing to the line or wire is preferred.

To accommodate the re-orientation of the antenna-unit, the luminaire has a cavity or void, in other words, an open space within the housing that allows for re-orientation. The cavity may simply be an open space without a hard boundary or wall. Alternatively, a walled cavity may be provided, which has included on the interior side of the cavity, padding for reducing the impact of antenna unit movement under severe wind conditions.

The modulation unit of the luminaire may operate as a node for setting up a point-to-point link or alternatively when connected with multiple nodes, may be used in a point-to multi-point radio communication system. The operating frequency for the first modulation unit is at least above 6 GHZ, and preferably in the mmWave frequency range, ranging from 30 GHz to 300 GHz, more preferably in the 60 GHz band which spans roughly 51-71 GHZ. The first modulation unit is preferably a MU-MUMO radio supporting directional links that use electronic beamforming, such known from IEEE 802.11ay-2021 style radios and/or Terragraph systems.

The first modulation unit may, for example, comprise a base-band unit and an RF unit for up-conversion and configured for driving a transmit signal over a feedline towards the first antenna unit for transmission. Alternatively, the first modulation unit may comprise the base-band unit, and the antenna unit may comprise the RF unit. In such an implementation, the first modulation unit will output the base-band signal and output this towards the antenna unit. The RF-unit located at the antenna unit will then be used to drive the feedline towards the antenna.

In case of bi-directional communication, the feedline is used to transport a transmit signal for transmission from the RF unit to the antenna and/or a received signal is transmitted from the antenna via the feedline to the RF unit for down-conversion and is subsequently provided to the base-band unit.

When using bi-directional communication different methods may be used to implement bi-directional operation. For example, the first modulation unit, may utilize Time Division Duplexing (TDD), in which the first antenna unit is alternatively operated in a transmission or reception mode. Other time-division approaches are also feasible where radios coordinate accesses, allowing a more flexible time-slot allocation for transmission or reception. When simultaneous transmission and reception is required, alternative methods of operation are envisaged which may include Frequency Division Duplexing, or FDD. In this case different frequencies are used for the transmission and reception, thereby allowing simultaneous transmission and reception using the first antenna unit.

In a first option of the first aspect, the levelling unit is a passive levelling unit comprising one of: a suspension element mounted inside the cavity of the housing, attached on one end to a first pivot, which first pivot is attached to the housing or to a member attached to the housing in a fixed manner and on another end attached to the antenna unit, so that the antenna unit can swing within the cavity under influence of gravity or a passive gimbal having at least one axis of rotation, mounted inside the interior space of the housing, attached on one end to part of the housing or a member attached to the housing in a fixed manner and on another end attached to the antenna unit, so that the antenna unit can rotate along the at least one axis of rotation, within the cavity under influence of gravity, the at least one axis parallel to the wire at the mounting point.

When a suspension element is used, the suspension element can be a set of three cables on one end attached to the first pivot point and on the other end attached to at least three points of the antenna unit, thereby stabilizing the antenna unit in a fixed position. Alternatively, the antenna unit may be suspended from a single cable at a point through a vertical line of the centre of mass of the antenna unit, to improve stability additional weight may be attached to the antenna unit. More optionally a rod or pendulum like construct may be used where the first pivot point is a hinge and a further hinge is provided on the antenna unit, above the centre of mass of the antenna unit. In this the range of motion of the antenna unit may be confined as compared to the cable implementations. Through the use of a flexible suspension element, such as the above cable mount(s), the suspension element can compensate for rotational movement in other directions than the rotational axis parallel to the line at the mounting point. When a passive gimbal is used to compensate for a rotation around a single rotational axis, this may be achieved by mounting the antenna unit on or preferably under an axis that is parallel to the direction of the line at the mounting point. Rotational movement resulting from sway of the luminaire will then be countered by rotational movement along the at least one axis of rotation. Although a passive gimbal with rotational movement in one direction means the gimbal can be low-cost, when so required, a multi-axis passive gimbal may be used to compensate for rotational movement in multiple direction.

In the above passive levelling units, it may be beneficial to add an additional weight to the antenna unit bottom, the additional weight improves the antenna unit stability as it increases the force exerted on the antenna unit weight combination.

In a second option of the first aspect the levelling unit is an active levelling unit comprising: a rotational sensor registering the angle of rotation of the luminaire, or alternatively the antenna unit, relative to the direction of gravity, along the rotational axis parallel to the line at the mounting point, a levelling unit controller arranged to use the rotational sensor output to generate a rotational control signal so as to counter the measured rotation; and a rotational actuator attached to the housing, controlled by the rotational control signal to adjust the orientation of the antenna unit relative to the housing.

The active gimbal of the second option allows variation of the relative orientation of the antenna unit with respect to the luminaire housing by means of the rotational actuator. The sensor used will typically be an accelerometer or other gravity sensor that can be mounted on either the luminaire or the antenna unit. Based on the output of the sensor the levelling unit controller may control the rotational actuator, to level the antenna unit based on the determined direction of gravity. When mounted on the antenna unit (depending on the orientation of mounting), the control should either maximize or minimize the measured gravity-based acceleration.

When mounted on the luminaire housing the rotational actuator rotation angle will need to be taken into account in the optimization process.

In a third option of the first aspect that may be combined with any of the options discussed above, the antenna unit comprises one of: multiple directional antennas each having a main lobe, wherein the respective main lobes of the directional antennas are oriented along different angular directions in line with the plane or at least one antenna having a 360 degrees radiation pattern in line with the plane.

The levelling function provides an advantage when the antenna emission pattern of the luminaire has an anisotropic character, as a result of which alignment of the radiation pattern(s) of the antennas becomes important. Although this is clear when having a radiation pattern that has a beam shape, it may also be relevant when the radiation pattern has a 360 degrees coverage in the horizontal plane, for example when the radiation pattern has the shape of a flattened torus. In these cases, where sway may interfere with the radiation pattern, sway compensation may help improve link quality when swaying.

The antenna configurations presented above typically have an anisotropic character because they aim to realize Radio Frequency, RF, coverage in a plane substantially orthogonal to the direction of gravity, thereby allowing luminaires to communicate with other luminaires in their vicinity.

In a fourth option of the first aspect that may be combined with any of the options discussed above, the antenna unit and the first modulation unit are mechanically attached to one another, or integrated on a first Printed Circuit Board, PCB.

In this manner the base-band unit, the RF unit and the antenna(s) of the antenna unit may be co-located and re-oriented in unison, by placement of the two units in close proximity the transmission of the baseband and/or radio signals can be reduced in length.

In a fifth option of the first aspect that may be combined with the first, the second and third options discussed above, the luminaire comprises a main Printed Circuit Board, PCB, comprising both the first modulation unit and a driver for the lighting unit.

In this manner the base-band unit may be provided on a main PCB, thereby reducing the number of PCBs and facilitating a separation between the high-frequency signals and the base-band components.

In a sixth option of the first aspect that may be combined with the any of the other options of the first aspect, the luminaire further comprises a second modulation unit for use as a communication node in a lighting control network enabling remote control of the lighting unit, the second modulation unit connected to a second antenna unit.

The sixth option allows the luminaire to be used in conjunction with conventional lighting control networks, that make use of other RF communication protocols, based on protocols such as 802.15.4, LoRa, NB-IoT, or cellular network protocols. The second radio unit may allow seamless operation of the luminaire, in existing wireless lighting control networks, that make use of established lighting control systems using Nema/Zhaga control nodes. The second radio may be provided on the Main PCB when combined with the fifth option of the first aspect, but alternatively may be provided as a detachable Nema/Zhaga control node.

In a seventh option of the first aspect, that may be combined with the first aspect or any one of the first to the fifth option of the first aspect, the lighting unit includes a first lighting controller, and the first lighting controller is connected to the first modulation unit and configured to receive lighting control information from the first modulation unit.

According to the seventh option, the wireless data network is not only used for data communication traffic, but also used to convey lighting control information over the wireless data network. Lighting control information may include data such as commands, sensor data and/or status reports of and for the lighting units. In particular when the wireless data network makes use of IPV6, it may be possible to assign to the first modulation unit two IPV6 addresses, wherein one IPV6 address is assigned to the luminaire as an illumination node, and another IPv6 address is assigned to the luminaire as a data communication node. This approach may be particularly useful when the setting up a new combined illumination and data communication network infrastructure.

In a eight option of the first aspect, that may be combined with the first aspect or any one option of the first aspect, the mounting point or fastening means is a clamp that clamps onto the line or wire and has a width in the direction of the line or wire, that is wider than 5 cm or preferably wider than 10 cm.

The eighth option, is preferably combined with a luminaire where the mounting point or fastening means is directly attached to the luminaire housing, thereby amount of sway, this in combination with a wide clamp will further limit the amount of movement in other directions.

In accordance with a second aspect of the invention an outdoor lighting system is provided having communication functionality comprising: a plurality of poles having, suspended between pairs of the poles, lines for mounting of luminaires, and wherein for each pair of poles at least a first pole of the pair comprises a power supply and a supply link connected thereto for providing power to further devices: a plurality of luminaires in accordance with the first aspect mounted on the lines between respective pairs of poles, and arranged to be powered by the first pole of the respective pair, wherein the first modulation units of the luminaires are configured to form a wireless data network; and a gateway comprising a gateway radio for communicating with the wireless data network and provided with a wireline or wireless link for providing access to a remote network.

The luminaires of the first aspect may be used in a lighting system to establish a data communication network, suitable for backhaul and/or fronthaul traffic. To this end the luminaires may be fitted with Gb speed radios, such as those compliant with the IEEE 802.1 lay standard. This type of lighting system may be used to deploy a high-speed network structure that can provide "last mile" network connectivity to the home.

In accordance with a first option of the second aspect the lighting system, the lighting system of the second aspect may preferably be adapted such that, at least one pole of one of the pair of poles, is fitted with a first peripheral device that requires network connectivity, the first peripheral device being one of: an environmental sensor with network connectivity, a camera with network connectivity, a cellular base station, a Wi-Fi hotspot, a kiosk for providing a user interface for users to access informational services and wherein the first peripheral device is powered by the supply link from the first pole of the pair of poles and said network connectivity is provided by the luminaire mounted on the line between the pair of poles.

The first option of the second aspect leverages connectivity provided by the luminaire based wireless data network, as a connectivity provider for further devices mounted on one of the poles between which the line or wire is suspended where the luminaire is mounted on. Alternatively, when such further devices are small enough to fit within the luminaire housing the devices may alternatively be integrated in the luminaire instead.

In accordance with a second option of the second aspect, which may be combined with the first option of the second aspect, the power supply is a PoE power sourcing device connected to a mains supply line and the supply link of the first pole of the one of the pair of poles is formed by one or more Power over Ethernet, PoE, cables (255), thereby enabling provisioning of power and network connectivity using the one or more PoE cables to the luminaire (10) mounted on the line suspended between the one of the pair of poles.

The supply link in the form of PoE cables provide power from the first pole of the pole pair to the luminaire, but at the same time provides connectivity from the luminaire to the first pole. Using the PoE links, the power and connectivity may be deployed to further devices at the pole, such as described under the first option of the second aspect.

In accordance with a third option of the second aspect, the lighting system further comprises: a pole-mounted luminaire mounted on a further pole: the pole mounted luminaire comprising: a further antenna unit and a further modulation unit for use as a communication node in the wireless data network connected to the further antenna unit.

Although in newly developed outdoor lighting system deployments, suspended luminaires may be aesthetically pleasing, circumstances may not allow the tethering of lines between poles in all instances. For this reason, hybrid systems, wherein both suspended luminaires and pole-mounted luminaires are deployed are envisaged.

In accordance with a fourth option of the second aspect which builds on the third option of the second aspect, the pole-mounted luminaire provides access to the wireless data network to a second peripheral device mounted on the further pole, the second peripheral device being one of: an environmental sensor with network connectivity, a camera with network connectivity, a cellular base station, a Wi-Fi hotspot, a kiosk for providing a user interface for users to access informational services.

In hybrid systems, the pole-mounted luminaires may be used to provide similar services to end users, to this end pole-mounted luminaires may also deploy a power-supply structure that uses PoE and that provides connectivity to the luminaire and the second peripheral(s).

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the outdoor luminaire of claim 1, and the outdoor lighting system of claim 10 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
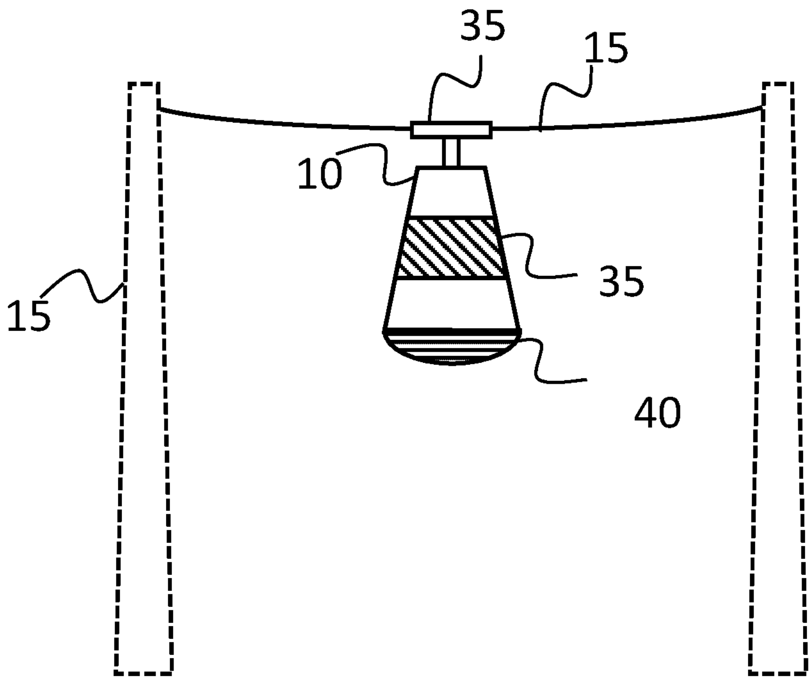
FIG. 1 depicts a luminaire mounted on a line suspended between a pair of poles.

The embodiments set forth below represent information to enable those skilled in the art to practice the embodiments.

Within outdoor lighting networks there is an increased need for connectivity. Connectivity in the past was provided by means of wireline networks which often were combined with the power infrastructure, or alternatively using separate power and wireless lighting control networks. Wireless lighting control networks, on account of the modest bandwidth requirements of lighting control applications, generally made use of techniques such as IEEE 802.15.4, which typically were complemented by higher layer protocols such as 6LOWPAN.

Because of the very nature of lighting networks, providing illumination for the benefit of people roaming through its coverage area, as well as their spatial deployment throughout urban areas and/or venues, outdoor lighting networks are promising candidates for also providing other networked services. Such networked services may range from (environmental) sensor-network services to wireless connectivity services for end-users, and/or providing other services as commonly found in smart cities.

Outdoor luminaires may have a role in providing a high-bandwidth wireless backbone that can enable many of these services. Such luminaires would include a radio, preferably built-in the luminaire, for esthetical, but also practical reasons, i.e. reduced exposure to the elements. The radios in turn are building blocks that allow creation of a data communication network, preferably a mesh network, where all or select luminaires out of the lighting network are designated as high-speed communication nodes that may provide network connectivity, up to Gbit speeds, for deploying services and/or network connectivity at nearby premises.

The wireless backbone is preferably connected at one or more locations to a wireline network, such as a fiber optics network. Using the wireless Gbit mesh network, the need to deploy network cables, which often causes great inconvenience can be reduced. In doing so a layered structure is created where on the bottom we see the wireline layer, which may use dedicated coaxial cables or a single-mode fiber optics network. Such a fiber network may be a host fiber (i.e. an optical fiber on which capacity is rented out to multiple tenants) or can be proprietary fiber (e.g. optical fiber put in place for dedicated application such as a telecom provider putting in their own fiber for a telecom site, or a dedicated optical fiber to a security camera).

On the top we see the "access layer", which has the typical equipment that is accessed through the fiber layer. This may include security cameras, IoT devices, Wi-Fi access points (for example Wi-Fi-5 and/or Wi-Fi-6) providing network access to the public (either free-of-charge, or pay-for-use Wi-Fi, private Wi-Fi). Optionally the same infrastructure may additionally or alternatively be used to provide network connectivity to private or commercial premises, thereby providing an alternative to fiber-to-the-home style deployments. More optionally the network connectivity may also serve as a backbone for small-cell cellular base-stations for telecom operators.

A wireless mesh network that uses the outdoor lighting infrastructure as envisioned by the present invention can thus provide "last-mile" connectivity using luminaires with embedded radios. An additional advantage is that installation is very simple because on the one hand all equipment is integrated in the luminaires and installation work is as simple as a luminaire replacement, in particular when the wireless network is made to be a self-organizing network, thereby reducing the need for elaborate manual commissioning.

In order to limit the amount of radio signal interference, the inventors consider the use of directional radio signals. Such signals may be generated using a passive directional antenna, which usually has an inconvenient form factor, or alternatively using an active array antenna. As a result, a point-to-point connection with a good signal to noise ratio can be established, that in comparison with omnidirectional transmitters reduce interference, in particular in dense networks.

Conventional outdoor lighting networks can make use of a variety of light poles and/or mounting points. However, in situations there can be preference to limit the number of poles for deploying the lighting infrastructure and/or a preference to utilize buildings as mounting points. In order to get satisfactory illumination coverage, it is possible to suspend lines, wires or cables, between poles and/or other mounting points and to deploy one or more luminaires on the lines between those points. FIG. 1 depicts a single luminaire 10 mounted on a line or wire 15 suspended between a pair of poles 15.

Due to the spatial deployment of outdoor lighting systems, often in urban environments, outdoor lighting systems are suitable for providing data communication networks in those areas. In order to facilitate this, the luminaires described herein comprise a radio, in the form of a modulation unit and an antenna unit, that enable the luminaires to function as communication nodes in the data communication network. The luminaire 10 comprises a housing 20 that protects the interior of the luminaire from the elements. The luminaire has a first exit window 40 for egress of illumination light from the luminaire and a second exit window 35 for ingress and egress of radio communication signals.

The luminaire 10 is provided with a fastening means or mounting point 35 here in the form of a clamp that can be used to attach the luminaire to the line 15, although FIG. 1 shows a single luminaire mounted between the pole pair, in practice the poles or mounting point may be further apart, and multiple luminaires may be mounted on the line. The line preferably is an assembly of a load bearing member, such as a steel cable, a supply member such as a weatherproofed power line and a weather proofed network member, such as a UTP type cable. More preferably, the supply and network member are combined into a single PoE type cable providing both power and network connectivity. Typically, the luminaires of the present invention receive power from the poles and provide network connectivity to networked devices mounted on the pole. Alternatively, when a pole is fitted with a connection to, for example a wireline or fiber optic network, the pole may also provide network connectivity to the luminaire(s). Instead of having a line which comprises three components, it may be beneficial to use a line comprising a load bearing member and one or more PoE cables, in this manner power and network connectivity may be provided to the luminaire.

Instead of using multiple PoE cables when multiple luminaires are mounted on a line, it may also be possible to use PoE cables that are daisy chained using PoE pass through devices, allowing multiple luminaires to be powered and/or connected. As a result of power requirements daisy chained operation may not always be possible. Although multiple luminaires may be mounted on a line, not all of them need to be fitted with a high-speed radio system for providing wireless data network connectivity, instead some luminaires may be conventional luminaires.

In FIG. 1, the luminaire is mounted on the line with a clamp, preferably the clamp has a width in the direction of the line, that is more than 5 cm or, more preferably, more than 10 cm wide. In this manner the mounting will be more resilient to (in the picture) sideways movement when the line is exposed to wind and the sway will be substantially in the plane orthogonal to the direction of the line at the mounting point.

Figure 2:
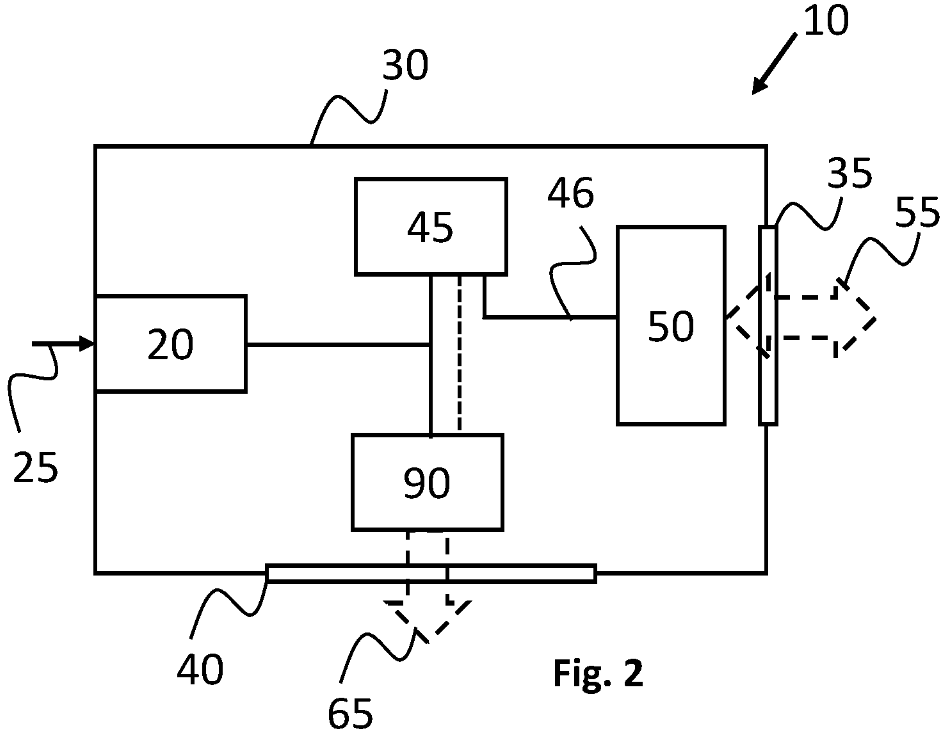
FIG. 2 depicts a simplified block diagram of a luminaire.

FIG. 2 depicts a simplified block diagram of a luminaire 10 with a focus on the lighting and radio components. The luminaire in question may be mounted on a line suspended between to mounting points as discussed in relation to FIG. 1. The luminaire comprises a power connector 20 for receiving power from a power cable 25 from the pole. This connector preferably is integrated in the housing 30. Alternatively, a power cable may be provided on the luminaire 10 with a connector to connect to the pole. The power received from the pole is used to power a lighting unit 90) and a first modulation unit 45.

The housing 30, comprises a first exit window 40 for egress of illumination light 65 and a second exit window 35 for ingress and egress 55 of a radio communication signals. The first exit window 40 for egress of the illumination light is transparent to the illumination light and may for example be clear, frosted or fitted with other means to provide homogeneous illumination. The second exit window 35 needs to be transparent for radio frequency waves and may for example be manufactured from a non-transparent plastic which shields the internals of the luminaire 10 from view. Inside the housing we find the first modulation unit 45 for use as a communication node in a wireless data network connected to a first antenna unit 50 also internal to the housing. The first modulation unit comprises at least one baseband unit (not shown) and is configured to generate a first modulated signal 46 for transmission which is passed on to the first antenna unit.

The housing also houses the first antenna unit 50 having at least one antenna 100. The antenna will preferably be a directional antenna, which may be facing primarily in a first direction. Preferably the first direction is mechanically re-orientable within a plane orthogonal to a vertical axis, when the luminaire is mounted on the line. In this manner the directional antenna(s) may be configured to create a point-to-point link. And when multiple antennas are provided to create multiple point-to-point links or a point-to-multipoint link. When using a directional antenna, the antenna may be a static antenna or an active array antenna. In case of an active array antenna, the optional mechanical antenna re-orientation may, further be complemented by beamforming using an active array antenna.

In order to implement beamforming, the first modulation unit 45 will typically comprise one (or more) baseband unit(s) as discussed above, that modulate MAC layer data packets into baseband signals for transmission. After digital-to-analog conversion by the baseband unit, the modulated signals are sent to an RF unit where the modulated signals are typically low-pass filtered prior to being passed on to an IQ mixer for up-conversion. The RF unit may be co-located with the base band unit or may alternatively be co-located with the antenna unit.

In case an active antenna array is used the RF-unit having performed the up-conversion is followed by a power-distributor and phase-shifters. The phase-shifted antenna signals are subsequently passed to line amplifiers prior to being passed onto the feedlines feeding the respective array antenna elements.

Conversely, when the first antenna unit (50) and the first modulation unit (45) are used for receiving a signal, the signals received by the respective array antenna elements of the array antenna of the first antenna unit will be passed to the respective low-noise amplifiers for amplification. Prior to being passed on to the phase-shifters. The received phase-shifted signals will then be combined by a combiner and passed on to the IQ mixer for down-conversion. Thereafter the IQ branches will, generally after low-pass filtering be passed onto a baseband unit, where the branch signals are analog-to-digital converted and demodulated.

Figure 3A:
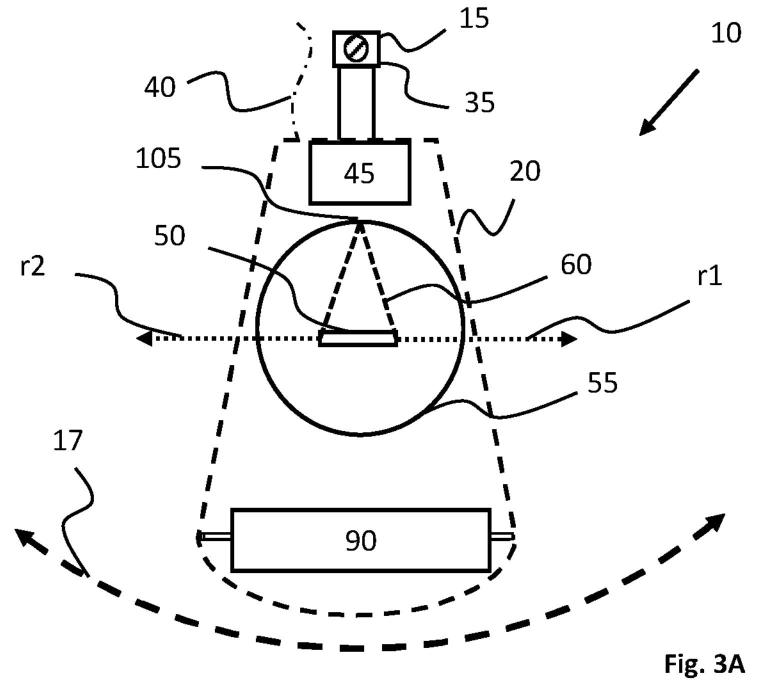
FIGS. 3A and 3B depict a schematic representation of a luminaire employing passive sway compensation.
Figure 3B:
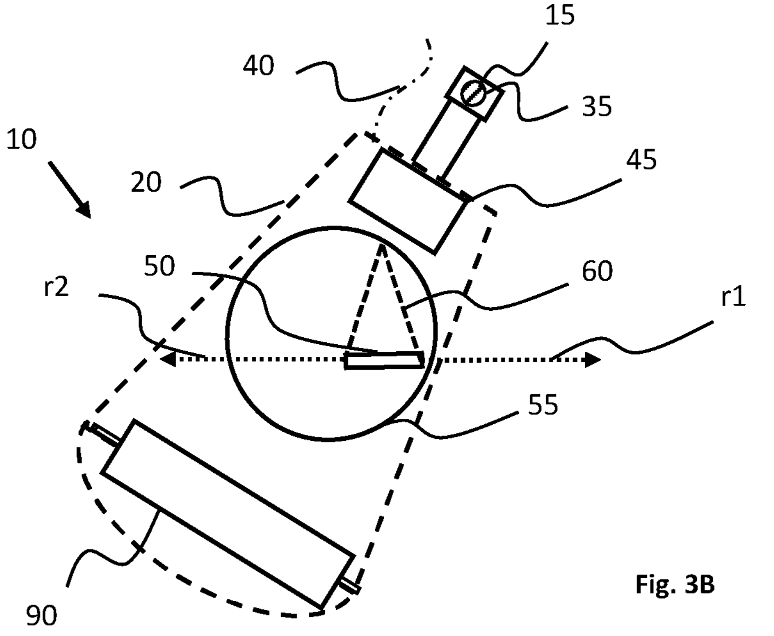

FIGS. 3A and 3B depict a schematic representation of a luminaire 10 mounted on a line 15 in two distinct states. When a luminaire is mounted on a line between two poles, the luminaire it will be mounted as shown in FIG. 3A, i.e. the stationary position. However, under influence of wind, the luminaire may sway as is depicted in FIG. 3B. The luminaire 10 is mounted using the mounting point 35 on the line 15 wire, depicted as the hatched cross-section inside the mounting point 35. The luminaire 10 may swing under influence of wind from left to right and back within a plane orthogonal to the mounting point. The luminaire housing 20 indicated by the broken line covers the interior of the luminaire from the elements. Inside the housing we have a first modulation unit 45, a lighting unit 90 and an interior cavity 55. The cavity, may be an open space sufficiently large to accommodate the antenna unit 50 here mounted from a suspension element 60 attached on one end to a first pivot 105, attached to the housing, or a member fixed to the housing, and on the other end attached to the antenna unit 50. The suspension element allows the antenna unit to move freely within the cavity under influence of gravity. When the luminaire is at rest, as is depicted in FIG. 3A, the antenna unit is level and may emit radio signals in directions r1 and r2. When the luminaire is swaying, as is depicted in FIG. 3B the antenna unit may substantially maintain its alignment, in spite of the motion of the luminaire, by movement within the cavity.

The suspension element 60 depicted in FIGS. 3A and 3B comprises a number of cables or tethers, preferably three, that are attached to three separate points on the antenna unit, thereby providing a stable antenna unit platform. However, alternatively a single tether may be used, provided that the antenna unit weight balance is such that it under influence of gravity it automatically levels. When such is not the case, this may be fixed by further weighting the antenna unit such that the center of gravity of the antenna unit in the luminaire at rest is under the first pivot 105.

Figure 4A:
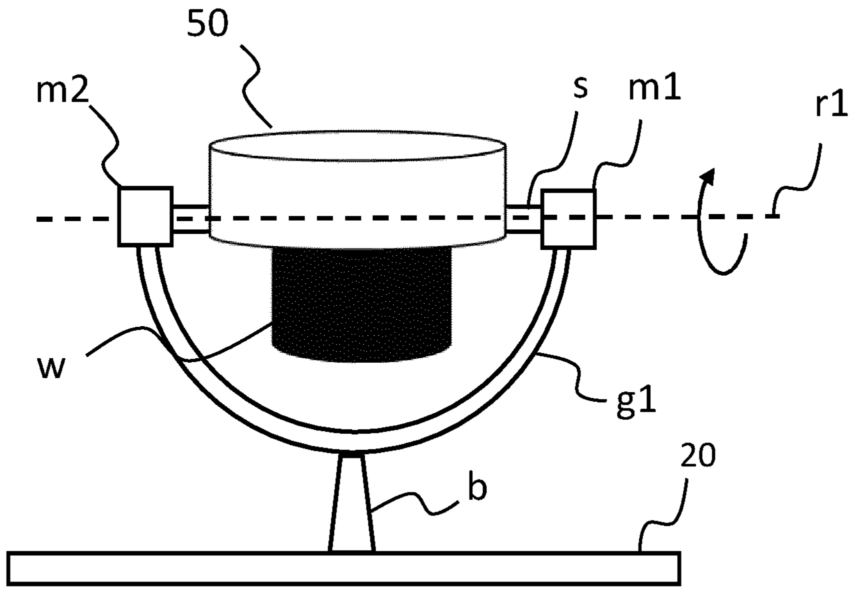
FIGS. 4A and 4B depict a schematic representation of a passive and active gimbal for use in a luminaire respectively.
Figure 4B:
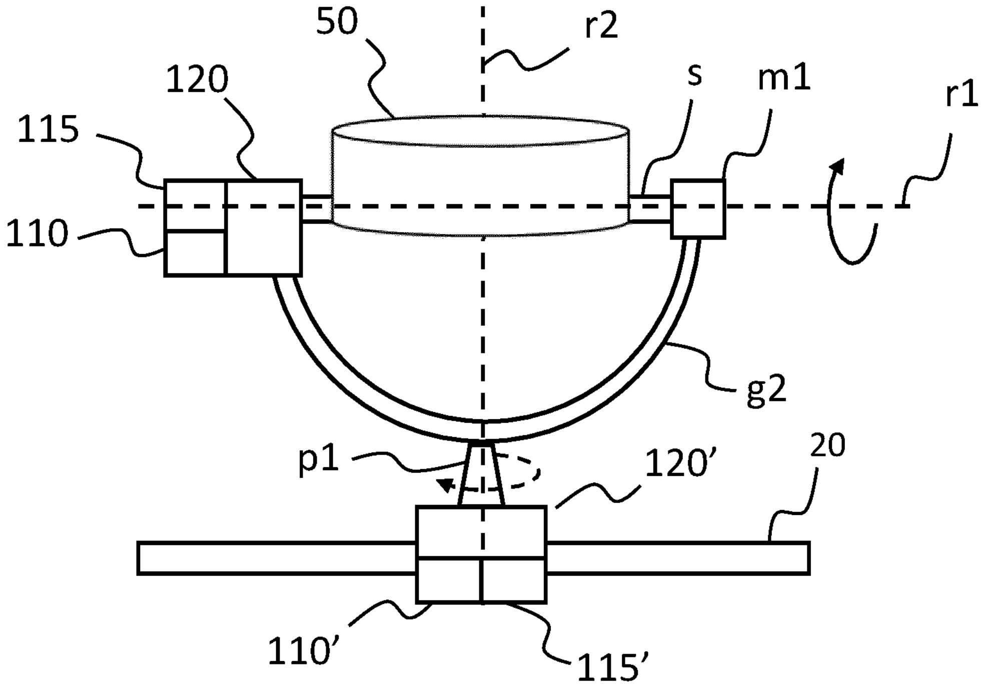

FIGS. 4A and 4B depict a schematic representation of a passive and active gimbal respectively that aim to compensate for rotation of the luminaire around an axis of rotation r1 parallel through the line at bearings m1 and m2. The passive one-dimensional gimbal of FIG. 4A uses a tuning fork like design, consisting of a base b and two prongs g1 ending in two bearings m1 and m2, for receiving a shaft s onto which the antenna unit 50 is mounted. To safeguard the orientation of the antenna unit, an additional weight w may be fitted to the antenna unit 50 to improve orientation stability. Alternatively, the antenna-unit could be mounted below the shaft s, thereby reducing the need for a weight, but when doing so the prongs g1 might block the antenna unit's emissions in certain situations. It will be clear to those skilled in the art that instead of using the prong design, and equivalent result may be achieved by attaching the bearings m1 and m2 to a housing part, thereby taking a way the need for the base b and prongs g1, but still allowing for compensation of rotation around the axis r1.

FIG. 4B depicts a similarly shaped active one-dimensional or two-dimensional gimbal where one of the bearings is replaced with a first rotational actuator 120 here attached to the housing through prongs g2 and the pivot p1 and a second rotational actuator 120'. The rotational actuator 120 is controlled by a rotational control signal from a levelling control unit controller 115, that controls the gimbal so as to adjust the orientation of the antenna unit relative to the prongs g2. To this end a rotational sensor 110 registers the angle of the housing relative to the direction of gravity and aims to orient the antenna unit so as to correct for rotation and maintain the original transmit direction upon swaying of the luminaire.

FIG. 4*b* also depicts an optional further axis of rotation, whereby a further rotational sensor 110', levelling unit controller 115' and rotational actuator 120' are used to correct for any rotational movement along a further axis of rotation.

Figure 5A:
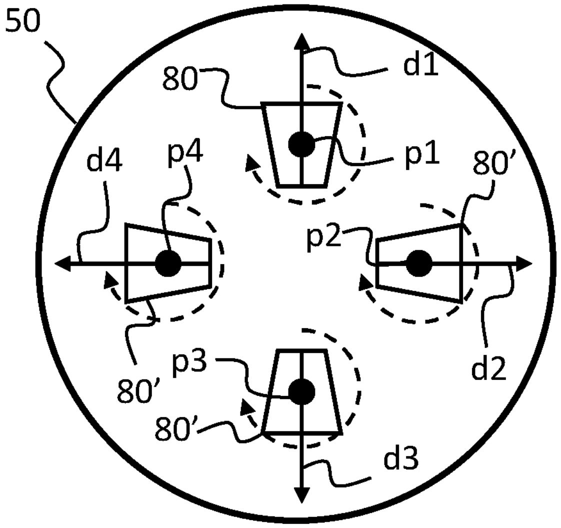
FIGS. 5A, and 5B depict an exemplary antenna unit for deploying re-orientable directional antennas.
Figure 5B:
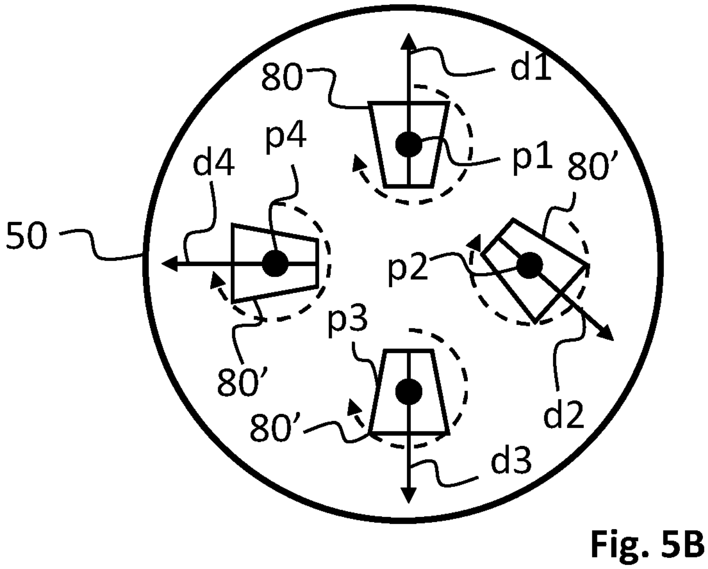

FIGS. 5A and 5B depict a top-view, of an antenna unit having 4 re-orientable directional antennas 80, 80' each facing in an individually re-orientable direction d1, d2, d3, d4. Each of the directional antennas 80, 80' may be used to emit and receive signals in the respective associated direction. The antennas may be re-oriented by rotating them around their respective pivot, p1, p2, p3 and p4. Although the figures show 4 antennas, which may be practical for most situation, larger or smaller number of antennas will be possible.

Preferably, each of the antennas 80, 80' can be reoriented by rotating them around the respective pivot points as indicated. In such embodiments, preferably the antenna units combined cover a 360-degree range in the horizontal plane orthogonal to the vertical. It may be beneficial for each antenna 80, 80' to be able to span a range of more than 90-degrees, however typically, for a four-antenna unit luminaire it will be sufficient for at least one antenna unit to cover one of the quadrants. For the four-antenna luminaire depicted in FIG. 5A, this may imply that each antenna unit rotate so as to cover a 90-degree angle, wherein the depicted directions d1, d2, d3 and d4 are the center directions. FIG. 5B, shows how a directional antenna may be rotated along the pivot point 2 to re-orient the direction of emission/reception. As indicated the directional antenna may be a static antenna or an active antenna. In case of an active antenna, the mechanical antenna reorientation may, be complemented by beamforming using an active array antenna. Although at a higher level of abstraction the operation of these alternatives is similar for the first modulation unit 45 and the first antenna unit 50, there are subtle differences.

In order to implement beamforming, the first modulation unit 45 will typically comprise one (or more) baseband unit(s) as discussed above, that modulate MAC layer data packets into baseband signals for transmission. After digital-to-analog conversion by the baseband unit, the modulated signals are sent to an RF unit where the modulated signals are typically low-pass filtered prior to being passed on to an IQ mixer for up-conversion. In case of the active antenna array this is followed by a power-distributor and phase-shifters. The phase-shifted antenna signals are subsequently passed to line amplifiers prior to being passed on to the feedlines feeding the respective array antenna elements.

Conversely, when the first antenna unit 50 and the first modulation unit 45 are used for receiving a signal, the signals received by the respective array antenna elements of the array antenna of the first antenna unit will be passed to the respective low-noise amplifiers for amplification. Prior to being passed on to the phase-shifters. The received phase-shifted signals will then be combined by a combiner and passed on to the IQ mixer for down-conversion. There after the IQ branches will, generally after low-pass filtering be passed onto a baseband unit, where the branch signals are analog-to-digital converted and demodulated. Depending on the implementation, the RF units may be co-located with the baseband unit or alternatively co-located with the active array antennas.

Although it is possible to use an active array antenna to implement a directional link, mechanical alignment of the active array antenna remains beneficial. When using MU-MIMO techniques proper mechanical alignment of the array antennas involved in setting up a link generally improves the channel transfer matrix as antenna alignment may result in a better conditioned channel, that in turn improves the achievable throughput.

Figure 6:
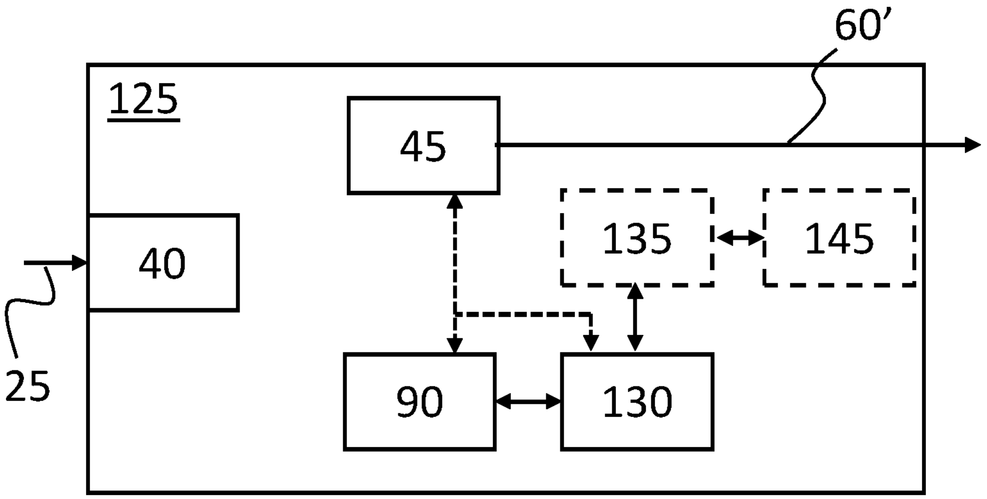
FIG. 6 depicts a simplified block diagram of a printed circuit board for use in a luminaire.

The re-orientable antenna arrangements shown in FIGS. 5A and 5B are particularly useful when multiple parallel links are used to create a mesh like network structure that allows compensation for incidental, or structural obstruction of the line-of-sight between two communicating transceivers. FIG. 6 depicts a simplified block diagram of a printed circuit board 125 for use in a luminaire. The PCB includes a power input 40 for powering the devices on the PCB, the PCB further includes the first modulation unit 45 together with the lighting unit 90 and a driver 130 for driving the lighting unit. Two options are depicted for controlling the lighting unit.

In a first option the PCB further include a second modulation unit 130 and a second antenna unit 145. The second modulation unit is configured to operate as a communication node in a wireless lighting control network. The second modulation unit may make use of IEEE 802.15.4, Lora, NBIoT, or cellular technology such as 3G, 4G, LTE for setting up a network link to accommodate the lighting control networks. In case of 802.15.4 the lower layer may be complemented by higher layer protocols such as 6LoWPAN.

Use of a second modulation unit may for example be particularly relevant when a municipality already has a wireless lighting control network deployed using radio modules connectable using Zhaga/Nema connectors. More optionally, all luminaires in a lighting system are fitted with such a second modulation and antenna unit providing the conventional wireless lighting control function and only select ones of the luminaires are also fitted with a high-speed data communication network link as described herein. In this manner the select nodes may function as bridge(s) that provide backhaul link(s) for the wireless lighting control network. The latter may be particularly useful when the lighting control network utilizes IPv6.

A second option depicted in FIG. 6, is that there is no second modulation unit and/or antenna unit on the PCB (hence the broken lines), and instead the first modulation unit communicates with the lighting unit 90 and the driver 130. In this manner it may be possible to completely abandon the conventional wireless lighting control network technology and deploy both the traffic of the conventional wireless lighting control network and the traffic of the higher speed wireless data communication network, on the high-speed data communication network formed by the first modulation unit and antenna unit. In such networks, luminaires might be fitted with multiple Ipv6 addresses, one corresponding to the luminaire's lighting node, for the lighting control data, and one corresponding to the luminaire's data communication node.

Although in the above the use of the second radio unit is coupled to the use of a main PCB, it will be clear to those skilled in the art, that different implementations are envisaged that implement the same functionality, but where the functionality is partitioned differently and implemented using other PCB arrangements. This may for example be used when a more modular design is required. In such a situation all lighting electronics may be implemented on a lighting PCB, the first modulation unit may be implemented on a separate PCB and the second radio unit may be implemented on a separate PCB included in a standardized detachable Zhaga or Nema unit.

Figure 7:
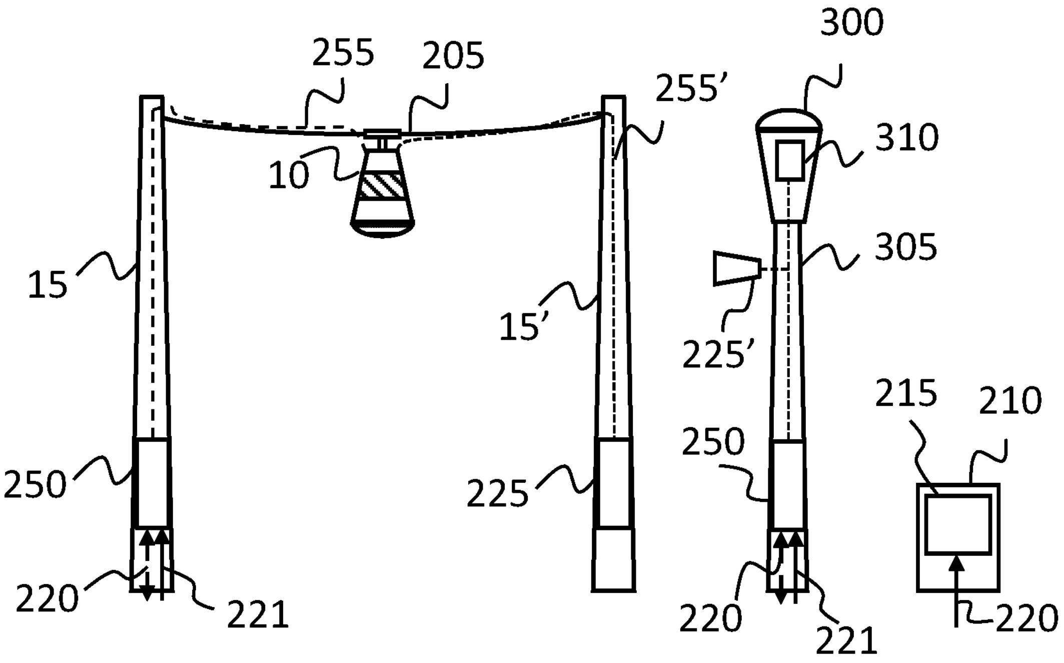
FIG. 7 depicts a lighting system comprising various lighting system components.

FIG. 7 depicts a lighting system having a communication functionality comprising various lighting system components. The core lighting system comprises a plurality of poles 15, 15' (here only two are shown) having, suspended between pairs of the poles, lines 205 for mounting of luminaires 10, and wherein for each pair of poles at least a first pole 15 of the pair comprises a supply link 250 for providing power to the luminaire 10 and when provided further devices mounted on the pair of poles. The system includes a plurality of luminaires 10 (only one shown) as described above, mounted on the line 205 between a respective pair of poles, and arranged to be powered by the first pole 15 of the respective pair. The first modulation unit of the luminaire 10 is configured as a wireless node in a wireless data network, which preferably uses directional mmWave communication. Apart from the poles and luminaires the system also includes a gateway 210, which may take the shape of a floor mounted cabinet, a pole mounted cabinet, or may be a cabinet mounted on a building. The gateway 210 has a bridging function for on the one hand communicating with the wireless data network formed by the luminaires equipped with the first modulation and first antenna units and on the other hand communicating with a wireline or wireless link 220 for providing access to a remote network, such as a further WAN or the internet. The gateway comprises a gateway radio 215 configured to communicate as a node in the wireless data network formed by the luminaires 10.

The lighting system may be used solely to provide a data communication function but may alternatively or additionally be used for deploying services as is customary in a smart city setting. To this end additional peripherals may be installed in the luminaire, or if this is not feasible in view of the size requirements, then the luminaire may also provide connectivity to such peripherals mounted on one or both poles of the pole pair.

FIG. 7 depicts an example wherein the pole 15' is fitted with a first peripheral device 225 that requires network connectivity, the first peripheral device may for example be a small kiosk providing booking and/or informational services to passers-by. Other types of peripherals that require network functionality may be deployed that span a wide range of applications, such as environmental sensors with network connectivity, a camera with network connectivity, a cellular base station, to a Wi-Fi hotspot. The location of the peripheral on the pole may be selected based on the intended use, a service requiring user interaction will typically be placed within reach of the users on the lower half of the pole, whereas camera and base-stations would typically be placed higher on the pole in favour of coverage. Power may be provided by the power supply 250 using a supply link 255 from the first pole to the luminaire. Network connectivity in turn may be provided by the luminaire 10 by means of a network cable 255' running from the luminaire to the first peripheral 225.

Preferably, the supply link 255 of the first pole of the pair of poles is formed by one or more Power over Ethernet, PoE, cables, based on IEEE802.3at technology or IEEE802.3bt-2018 when more power is required. When using PoE the supply and network connectivity may be combined in an efficient manner, effectively rendering the supply link and the network cable 255' the same type of cable. In such an implementation the power supply 250 will be a PoE power sourcing device connected to a mains supply line and arranged to provide power and network connectivity using the PoE cable(s) to the luminaire mounted on the line 205 suspended between the poles and to the first peripheral device 225. The PoE power sourcing device may in turn be connected to a power grid 221 but may optionally also be connected to a further wireline network using data communication link 220.

Although it is possible to use a PoE cable, alternative assemblies of a power line and network cable are possible, as a result, additional components, such as switches, may be required.

As shown in FIG. 7, the lighting system may also comprise poles such as pole 305 having mounted there on a pole-mounted luminaire 300. Pole-mounted luminaires here are luminaires where a luminaire is mounted on the top or on an arm of a pole. The pole-mounted luminaires may comprise a modulation unit and an antenna unit, combined shown as the unit 310, similar to those found in the luminaire 10, allowing the luminaire 300 to operate as a communication node in the wireless data network.

The pole 305 with the pole-mounted luminaire 300 may in turn comprise a power supply 250 for powering the pole-mounted luminaire and a second peripheral 225', such as those presented above in relation to the first peripheral device that in turn may be powered and connected using a similar PoE infrastructure. Other variations to the disclosed embodiments can be understood and effected by those skilled in the art in practicing the claimed invention, from a study of the drawings, the disclosure and the appended claims. In the claims, the word “comprising” does not exclude other elements or steps, and the indefinite article “a” or “an” does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed.

The invention claimed is:

1. An outdoor luminaire for suspended mounting from, or attached to, a line, the luminaire comprising:

a housing of the luminaire having
- a first exit window for egress of illumination light and
- a second exit window for ingress and egress of a radio communication signals;

mounting point attached to the housing for attaching the housing to the line;

a power input for providing power to the luminaire;

a levelling unit attached to the housing or to a member that is attached to the housing in a fixed manner, and to an antenna unit inside an interior cavity of the housing, the levelling unit configured to either passively, utilizing gravity, or actively, utilizing a rotational actuator, counter rotational movement of the luminaire along a rotational axis parallel to the line at the mounting point;

a first modulation unit for use as a communication node in a wireless data network connected to the antenna unit, the first modulation unit configured to generate a first modulation signal;

the antenna unit attached to the levelling unit, wherein the antenna unit comprises at least one antenna for:
- emitting a first radio signal based on the first modulation signal through the second exit window along a radiation pattern having a main lobe, when the luminaire is level, in line with a plane orthogonal to the gravitational axis when the luminaire is mounted and
- receiving a second radio signal through the second exit window; and a lighting unit comprising one or more light sources for emitting illumination light through the first exit window.

2. The luminaire of claim 1, wherein the levelling unit is a passive levelling unit comprising one of:

a suspension element mounted inside the cavity of the housing, attached on one end to a first pivot, which first pivot is attached to the housing or to a member attached to the housing in a fixed manner and on another end attached to the antenna unit, so that the antenna unit can swing within the cavity under influence of gravity or a passive gimbal having at least one axis of rotation, mounted inside the interior space of the housing, attached on one end to part of the housing or a member attached to the housing in a fixed manner and on another end attached to the antenna unit, so that the antenna unit can rotate along the at least one axis of rotation, within the cavity under influence of gravity, the at least one axis parallel to the line at the mounting point.

3. The luminaire of claim 1, wherein the levelling unit is an active levelling unit comprising:

a rotational sensor registering the angle of rotation of the luminaire or the antenna unit, relative to the direction of gravity, along the rotational axis parallel to the line at the mounting point;

a levelling unit controller arranged to use the rotational sensor output to generate a rotational control signal so as to counter the measured rotation;

a rotational actuator attached, directly or indirectly, to the housing, controlled by the rotational control signal to adjust the orientation of the antenna unit relative to the housing.

4. The luminaire of claim 1, wherein the antenna unit comprises one of:

multiple directional antennas each having a main lobe, wherein the respective main lobes of the directional antennas are oriented along different angular directions in line with the plane or at least one antenna having a 360 degrees radiation pattern in line with the plane.

5. The luminaire of claim 1, wherein the antenna unit and the first modulation unit are mechanically attached to one another, or integrated on a first Printed Circuit Board, PCB.

6. The luminaire of claim 1, wherein the luminaire comprises a main PCB, comprising both the first modulation unit and a driver for the lighting unit.

7. The luminaire of claim 1, wherein the luminaire further comprises a second modulation unit for use as a communication node in a lighting control network enabling remote control of the lighting unit, the second modulation unit connected to a second antenna unit.

8. The luminaire of claim 1, wherein the lighting unit includes a first lighting controller, and the first lighting controller is connected to the first modulation unit and configured to receive lighting control information from the first modulation unit.

9. The luminaire of claim 1, wherein the mounting point is a clamp that clamps onto the line having a width in the direction of the line, wider than 5 cm.

10. A lighting system having communication functionality comprising:

a plurality of poles having, suspended between pairs of the poles, lines for mounting of luminaires, and wherein for each pair of poles at least a first pole of the pair comprises a power supply and a supply link connected thereto for providing power to further devices mounted on the pair of poles;

a plurality of luminaires in accordance with claim 1 mounted on the lines between respective pairs of poles, and arranged to be powered by the first pole of the respective pair, wherein the first modulation units of the luminaires are configured to form a wireless data network; and a gateway comprising a gateway radio for communicating with the wireless data network and provided with a wireline or wireless link for providing access to a remote network.

11. The lighting system of claim 10, wherein at least one pole of one of the pair of poles, is fitted with a first peripheral device that requires network connectivity, the first peripheral device being one of:

an environmental sensor with network connectivity, a camera with network connectivity, a cellular base station, a Wi-Fi hotspot a kiosk for providing a user interface for users to access informational services and wherein the first peripheral device is powered by the supply link from the first pole of the pair of poles and said network connectivity is provided by the luminaire mounted on the line between the pair of poles.

12. The lighting system of claim 10, wherein the power supply is a PoE power sourcing device connected to a mains supply line and the supply link of the first pole of the one of the pair of poles is formed by one or more Power over Ethernet, PoE, cables, thereby enabling provisioning of power and network connectivity using the one or more PoE cables to the luminaire mounted on the line suspended between the one of the pair of poles.

13. The lighting system of claim 10, further comprising:

a pole-mounted luminaire mounted on a further pole;

the pole mounted luminaire comprising:

a further antenna unit and a further modulation unit for use as a communication node in the wireless data network connected to the further antenna unit.

14. The lighting system of claim 13, wherein the pole-mounted luminaire provides access to the wireless data network to a second peripheral device mounted on the further pole, the second peripheral device being one of:

an environmental sensor with network connectivity, a camera with network connectivity, a cellular base station, a Wi-Fi hotspot a kiosk for providing a user interface for users to access informational services.

* * * * *